(12) United States Patent  
Choi (10) Patent No.: US 7,478,930 B2  
(45) Date of Patent: Jan. 20, 2009

(54) BACKLIGHT UNIT WITH AN OXIDE COMPOUND-LAMINATED OPTICAL LAYER

(75) Inventor: Yong Won Choi, Kyungki-do (KR)

(73) Assignee: Samsung Corning Precision Glass Co., Ltd. (KR)

( * ) Notice: Subject to any disclaimer, the term of this patent is extended or adjusted under 35 U.S.C. 154(b) by 214 days.

(21) Appl. No.: 11/431,581

(22) Filed: May 11, 2006

(65) Prior Publication Data

US 2007/0159843 A1 Jul. 12, 2007

(30) Foreign Application Priority Data

Jan. 12, 2006 (KR) .................... 10-2006-0003428  
Jan. 24, 2006 (KR) .................... 10-2006-0007229

(51) Int. Cl.  
*F21V 5/00* (2006.01)

(52) U.S. Cl. ...................... 362/330; 362/561

(58) Field of Classification Search ............. 362/97, 362/613, 561, 621, 622, 330, 367, 607; 359/586, 359/587, 588; 349/62  
See application file for complete search history.

(56) References Cited

U.S. PATENT DOCUMENTS 7,199,928 B2 * 4/2007 Uehara ................ 359/586  
2006/0279962 A1 * 12/2006 Loh .................... 362/561

* cited by examiner

*Primary Examiner*—Bao Q Truong  
(74) *Attorney, Agent, or Firm*—Lerner, David, Littenberg, Krumholz & Mentlik, LLP (57) ABSTRACT

A backlight unit includes a substrate, a plurality of light sources arranged on the substrate in a spaced-apart relationship with one another for irradiating lights, a total reflection layer for upwardly reflecting the lights irradiated from the light sources, and an optical layer disposed above the light sources and having an oxide compound layer laminated thereon. The optical layer is adapted to allow a part of the lights to pass through the optical layer but reflect the remaining part of the lights downwardly toward the substrate, to thereby induce the lights from the light sources to optically resonate. The optical resonance caused by the oxide compound-laminated optical layer helps to reduce the half amplitude of a color-based spectrum histogram in a light-emitting spectrum, thereby enhancing the color purity.

15 Claims, 9 Drawing Sheets

| SiO₂ (66nm) |
|---|
| TiO₂ (71nm) |
| SiO₂ (126nm) |
| TiO₂ (65nm) |
| SiO₂ (108nm) |
| TiO₂ (63nm) |
| SiO₂ (70nm) |
| TiO₂ (43nm) |
| SiO₂ (72nm) |
| TiO₂ (26nm) |
| Substrate |

FIG. 7B

| SiO₂ (67nm) |
|---|
| TiO₂ (68nm) |
| SiO₂ (125nm) |
| TiO₂ (56nm) |
| SiO₂ (101nm) |
| TiO₂ (48nm) |
| SiO₂ (52nm) |
| TiO₂ (29nm) |
| Substrate |

FIG.7C

| SiO₂ (64nm) |
|---|
| TiO₂ (63nm) |
| SiO₂ (114nm) |
| TiO₂ (55nm) |
| SiO₂ (81nm) |
| TiO₂ (17nm) |
| SiO₂ (106nm) |
| TiO₂ (8nm) |
| Substrate |

FIG.7D

| SiO₂ (97nm) |
|---|
| TiO₂ (52nm) |
| SiO₂ (88nm) |
| TiO₂ (78nm) |
| SiO₂ (35nm) |
| TiO₂ (14nm) |
| SiO₂ (54nm) |
| TiO₂ (8nm) |
| Substrate |

FIG.7E

| SiO₂ (88nm) |
|---|
| TiO₂ (61nm) |
| SiO₂ (80nm) |
| TiO₂ (17nm) |
| SiO₂ (33nm) |
| TiO₂ (17nm) |
| Substrate |

*FIG.8*

BACKLIGHT UNIT WITH AN OXIDE COMPOUND-LAMINATED OPTICAL LAYER

FIELD OF THE INVENTION

The present invention relates to a backlight unit, and more specifically, to a backlight unit capable of increasing a luminance through the use of optical resonance in an optical layer.

BACKGROUND OF THE INVENTION

A cathode ray tube ("CRT"), one of typical display devices, has been extensively used in television sets or computer monitors, but fails to catch up with the recent trend of miniaturization and lightweight of electronic equipments.

Thus, a variety of technologies have been developed in an effort to replace the cathode ray tube with new display devices, examples of which include a liquid crystal display ("LCD") using an electric field optical effect, a plasma display panel ("PDP") using a plasma discharge and an electroluminescence display ("ELD") using an electric field light-emitting effect.

Among these devices, the liquid crystal display, which features thin lightweight configuration and low electricity operability, is showing rapid expansion in its range of applications with the improvement of liquid crystal materials and the development of fine pixel processing techniques, and is widely used in household television sets, desktop computer monitors, notebook computer monitors, large-sized flat panel television sets and so forth.

Most of the liquid crystal displays require the use of a separate backlight unit that serves as a light-flatting element for regulating the quantity of an incoming light to display images.

Figure 1:
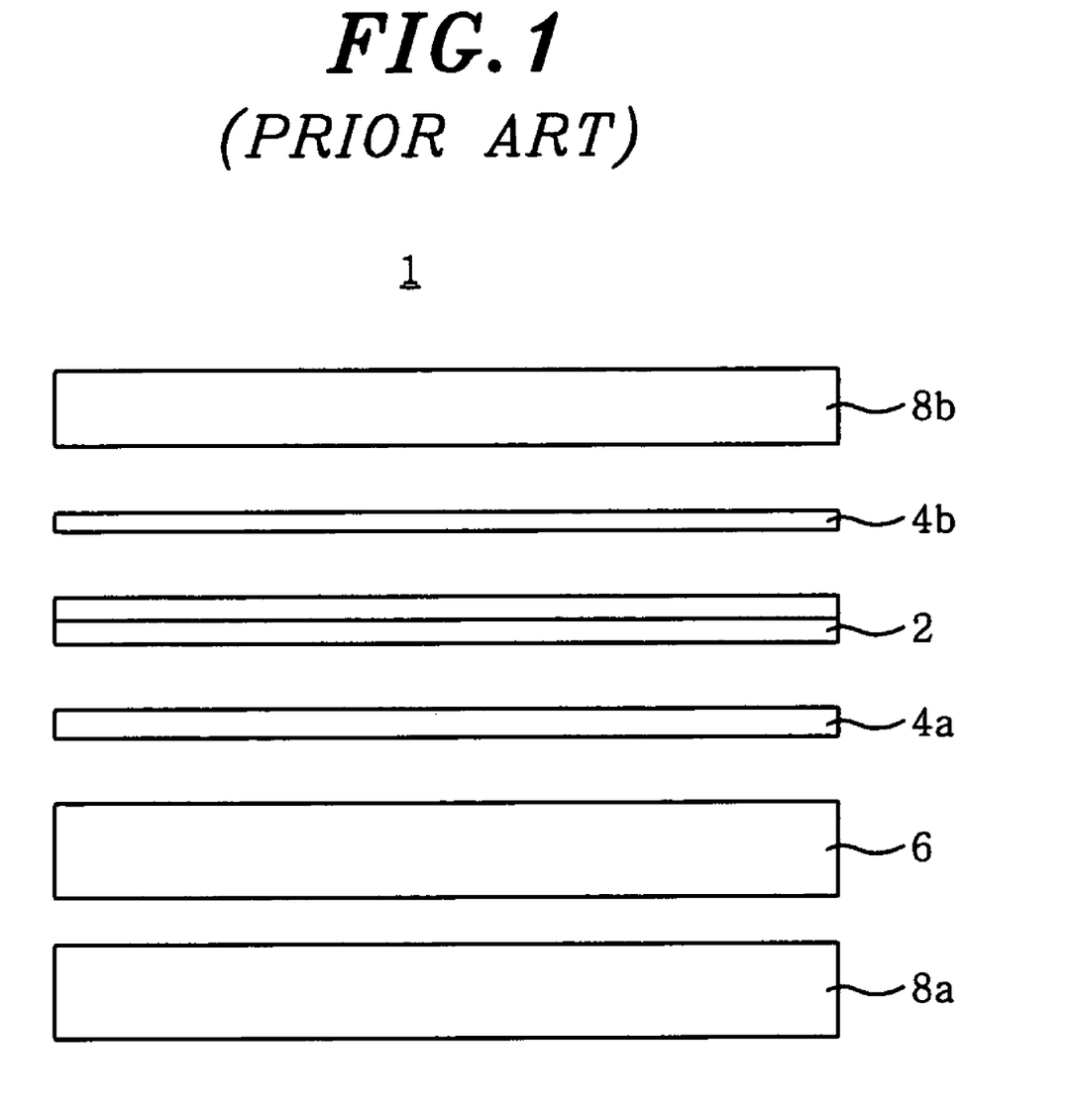
FIG. 1 shows an exemplary configuration of a prior art liquid crystal display module.

As shown in FIG. 1, a liquid crystal display module 1 for use in typical liquid crystal displays is comprised of a liquid crystal display panel 2 filled with liquid crystal, polarizing plates 4a and 4b for polarizing a light directed to the upper and lower surfaces of the liquid crystal display panel 2, a backlight unit 6 for supplying an uniform light to the liquid crystal display panel 2, a main support 8a for maintaining an external configuration of the liquid crystal display module 1, and a top case 8b.

Unlike the cathode ray tube or the plasma display panel, the liquid crystal display panel 2 does not emit any light by itself but merely changes orientation or arrangement of the liquid crystal. This makes it necessary to provide, at the rear of the liquid crystal display panel 2, the backlight unit 6 for evenly surface-irradiating the light on an information display surface.

Figure 2A:
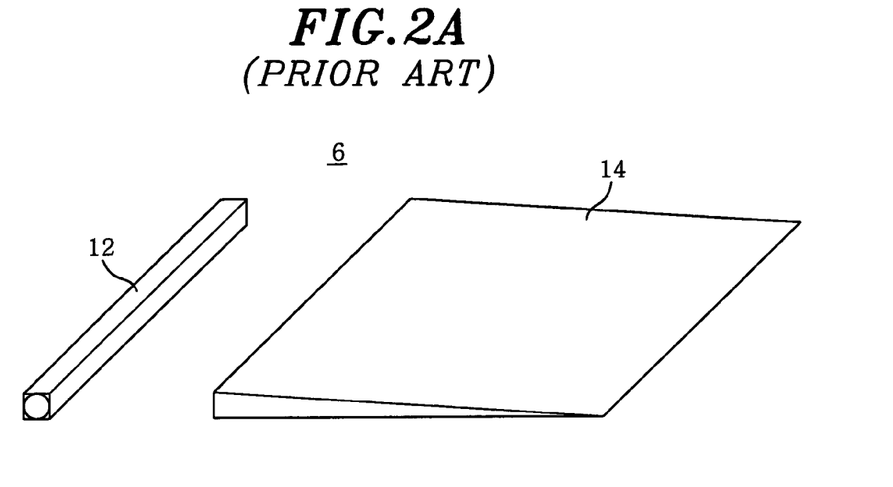
FIGS. 2A to 2C illustrate perspective views illustrating some kinds of typical backlight units.
Figure 2B:
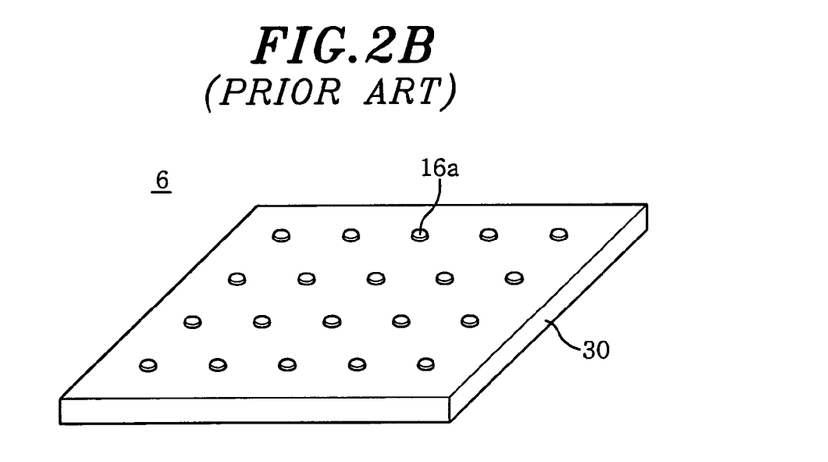
Figure 2C:
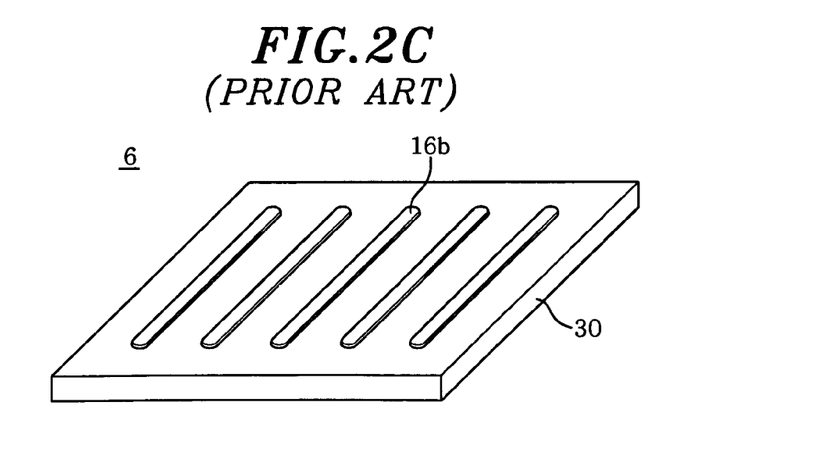

In this regard, the backlight unit 6 is classified into an edge type and a direct type depending on the position of a light source. As illustrated in FIG. 2A, the edge type backlight unit includes a light source 12 disposed at one edge of a light guide plate 14 for surface-irradiating a light. In contrast, the direct type backlight unit is subdivided into a dot type wherein a plurality of dot-like light sources 16a are mounted on a substrate 30 as shown in FIG. 2B and a line type wherein a plurality of linear light sources 16b are mounted on a substrate 30 as shown in FIG. 2C. In such direct type backlight units, the light sources are substantially evenly distributed on the entire surface of the substrate.

Examples of the light source conventionally used include an electroluminescence ("EL") element, a cold cathode fluorescent lamp ("CCFL") and a hot cathode fluorescent lamp ("HCFL"). In recent years, extensive use is made of a light emitting diode ("LED") that has a broad area of color reproduction and is environmentally friendly.

Research has been made to develop methods of using the light emitting diode as a light source in the backlight unit. Subjects of the research include a method of taking advantage of a blue color light emitting diode and an yttrium aluminum garnet ("YAG") fluorescent body, a method of using an ultraviolet emitting diode in combination with fluorescent bodies of red, green and blue colors, and a method of employing red, green and blue light emitting diodes to admix the lights generated from them.

The method of taking advantage of a blue color light emitting diode and an yttrium aluminum garnet ("YAG") fluorescent body is disadvantageous in that the light source thus produced has a reduced ability to express the red color and a low light emitting efficiency. Likewise, the method of using an ultraviolet emitting diode in combination with fluorescent bodies of red, green and blue colors poses a drawback in that it is difficult to develop the fluorescent bodies, with the resultant light source exhibiting a deteriorated thermal characteristic.

The method of employing red, green and blue light emitting diodes is effective in designing the light source to have a broadened range of color reproduction, thank to the increased intensity of red, green and blue lights emitted from the respective light emitting diodes. However, the method has a problem in that it is difficult to compose a combination of diodes for a white surface light source.

In the meantime, along with the recent trend of pursuing a large-sized and high image quality display device, a demand has existed for a backlight capable of outputting a high flux light. In order to comply with such a demand, there have been developed lenses for collecting lights emitted from light emitting diodes, semiconductor chips and diode materials.

A typical light emitting diode, one of solid semiconductor devices that convert electric energy to light energy, includes doping layers and an active layer. If a biasing voltage is applied to two oppositely positioned doping layers, electron holes and electrons are injected into the active layer and recombined to generate a light. The light generated in the active layer is emitted in all directions and escaped from the light emitting diode through every surface exposed to the outside. The light escaped from the light emitting diode is oriented to a desired direction by means of a backlight unit that incorporates the light emitting diode.

However, the light emitting diodes developed thus far cannot provide a sufficiently great light emitting efficiency, due to the light loss when penetrating a current diffusion layer and the light loss caused by a total reflection at a boundary surface.

Accordingly, in a backlight unit requiring an output of a high flux light, it is inevitable either to apply an increased current to a light emitting diode or to increase the number of light emitting diodes used.

In the case that an increased current is applied to a light emitting diode, a great deal of heat is generated from the light emitting diode, thus reducing the light emitting efficiency and making it necessary to add a heat radiation design to a substrate on which the light emitting diode is mounted. In the event that the number of light emitting diodes is increased, it becomes difficult to design the backlight unit, in addition to the increase of production cost of the backlight unit.

Although nitride semiconductor-based light emitting diodes and InGaAlP-based light emitting diodes have been developed for the purpose of enhancing the light emitting efficiency, they tend to emit a light whose flux is lower than that of a cold cathode fluorescent lamp and therefore are not suitable for use in a backlight unit.

SUMMARY OF THE INVENTION

It is, therefore, an object of the present invention to provide a backlight unit capable of improving a light emitting efficiency and a color purity of a light through the use of optical resonance in an optical layer.

In accordance with the present invention, there is provided a backlight unit for use in a liquid crystal display having a liquid crystal panel, comprising: a substrate; a plurality of light sources arranged on the substrate in a spaced-apart relationship with one another for irradiating lights; a total reflection layer for reflecting the lights irradiated from the light sources in an upward direction; and an optical layer disposed above the light sources and having an oxide compound layer laminated thereon, the optical layer adapted to allow a part of the lights to pass through the optical layer but reflect the remaining part of the lights downwardly toward the substrate, whereby the backlight unit can induce the lights irradiated from the light sources to optically resonate.

BRIEF DESCRIPTION DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings.

Figure 3:
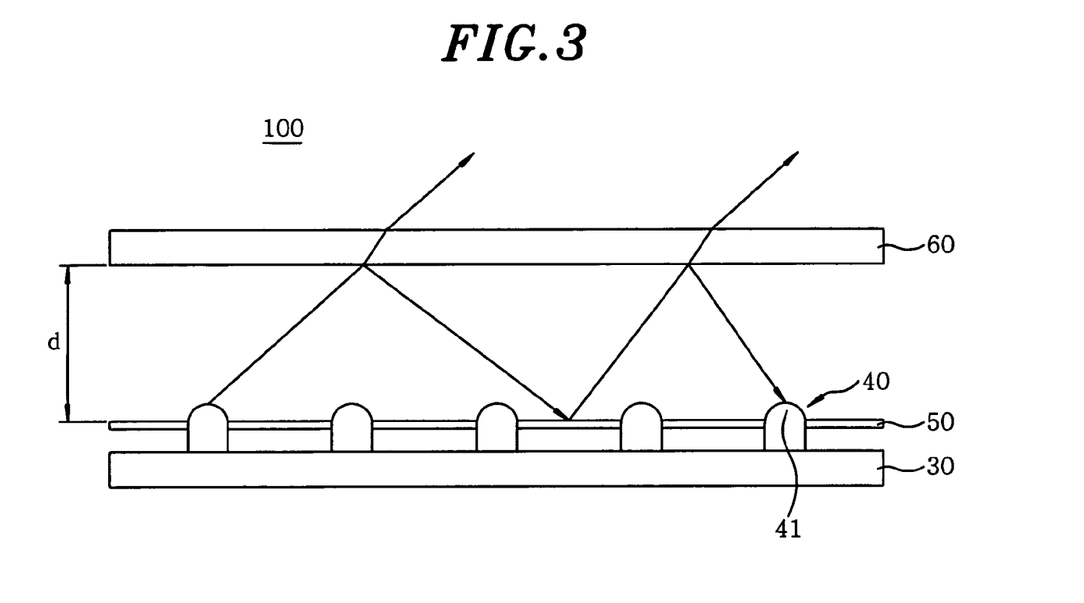
FIG. 3 is a front elevational view depicting a part of a backlight unit in accordance with the present invention.
Figure 4A:
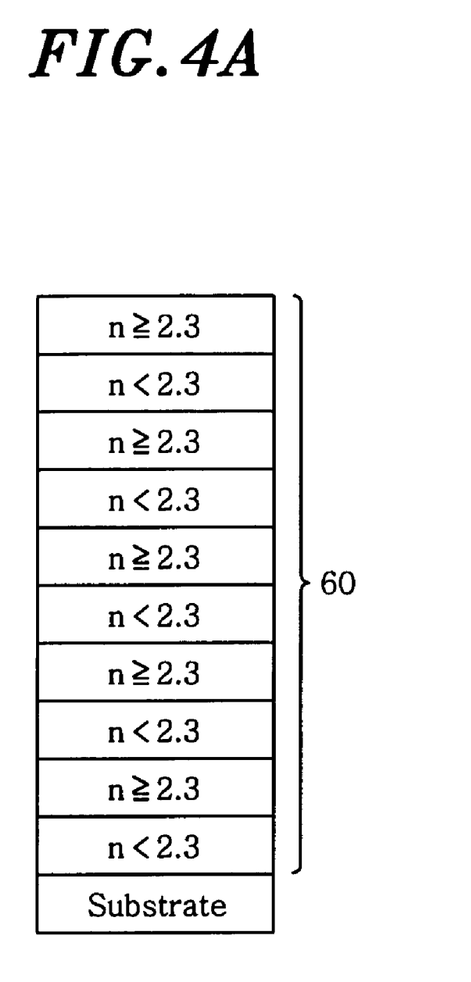
FIGS. 4A and 4B depict front elevational views showing laminated structures of an oxide compound in the optical layer shown in FIG. 3.
Figure 4B:
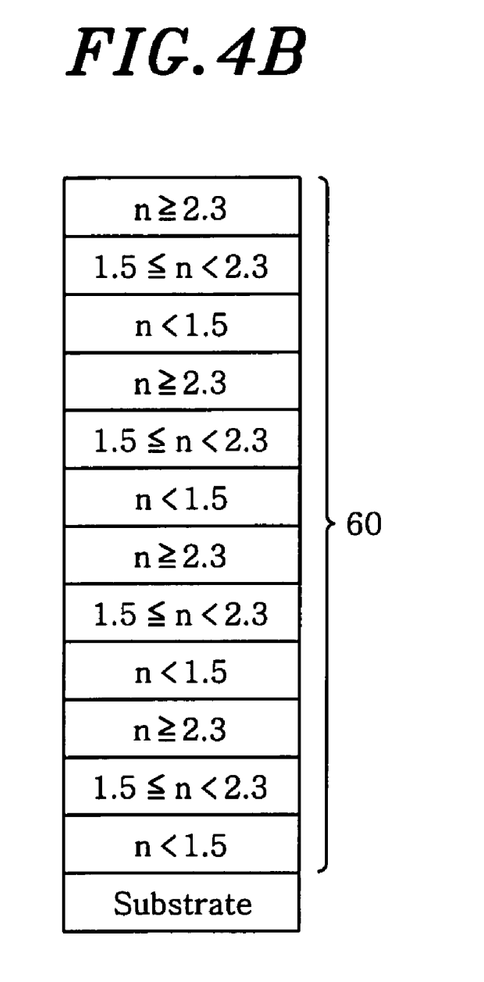

FIG. 3 is a front elevational view depicting a part of a backlight unit in accordance with the present invention, and FIGS. 4A and 4B are front elevational views showing laminated structures of an oxide compound in the optical layer shown in FIG. 3.

As shown in FIG. 3, a backlight unit 100 in accordance with the present invention includes a substrate 30, a plurality of light emitting diodes 40 arranged on the substrate 30 in a spaced-apart relationship with one another, a total reflection layer 50 for reflecting a light irradiated from the light emitting diodes 40 in an upward direction, i.e., toward a liquid crystal layer, and an optical layer 60 provided above the light emitting diodes 40 for allowing a part of the light to be transmitted therethrough and reflecting the remaining part of the light toward the substrate 30.

The substrate 30, on which is formed a pattern, serves to support the light emitting diodes 40 and dissipate the heat generated by the light emitting diodes 40. The light emitting diodes 40 are mounted on the substrate 30 at a generally equal spacing. The total reflection layer 50 is formed just below a light-emitting portion 41 of each of the light emitting diodes 40.

Alternatively, the total reflection layer 50 may be directly bonded to the substrate 30 on which the light emitting diodes 40 are mounted. Such a total reflection layer 50 is formed by bonding a light-reflective film of high reflectance to an aluminum plate. It is preferred that the light-reflective film has a reflectance of no less than 80% but is low in its absorbency and transmittance.

The optical layer 60 is disposed above the light emitting diodes 40 and the total reflection layer 50, with a predetermined optical distance "d" left from the total reflection layer 50. The optical layer 60 allows a part of the light to be transmitted therethrough and reflects the remaining part of the light toward the substrate 30. In order to ensure that the lights passed through the optical layer 60 can be subjected to constructive interference, the optical distance "d" between the total reflection layer 50 and the optical layer 60 is determined by the following equation:

$$\Sigma(n \times t) = m \times (\lambda/2)$$

where the "n" denotes a refractive index of the total reflection layer 50 or the optical layer 60, the "t" means a geometrical thickness of the total reflection layer 50 or the optical layer 60, the "λ" represents a peak wavelength of the light emitted from the light emitting diodes 40, and the "m" is a integer of greater than 0.

In the case that the light emitting diodes 40 emit a red light, a green light or a blue light, the lights passed through the optical layer 60 can make constructive interference with each other and thus give rise to optical resonance, if one half of the peak wavelength of the lights multiplied by an integer is equal to the sum of the refractive index multiplied by the geometrical thickness of the total reflection layer 50 or the optical layer 60.

In response to the optical resonance, the luminance of the light issuing from the backlight unit 100 is increased and the half amplitude of a color-based spectrum histogram in a light-emitting spectrum is reduced, thereby enhancing the color purity.

In this connection, it is a matter of course that a desired spectrum peak in the light-emitting spectrum can be obtained by adjusting the thickness of the total reflection layer 50 or the optical layer 60.

The maximum transmittance $T_{max}$, which results from the optical resonance caused by adjusting the optical distance "d" between the total reflection layer 50 and the optical layer 60, is represented by the following Equation:

$$T_{max} = [T_1 \times T_2 \times \exp(-2\beta)] / [1 - \sqrt{R_1 \times R_2} \times \exp(-2\beta)]^2$$

where $\beta = (2\pi kt \cos\theta)/\lambda$ where the "$T_1$" and "$R_1$" denote a transmittance and a reflectance of the optical layer 60, respectively, the "$T_2$" and "$R_2$" represent a transmittance and a reflectance of the total reflection layer 50, respectively, the "k" means an extinction coefficient, the "t" refers to a geometrical thickness, the "θ" is an angle of the light advancing from the internal space between the total reflection layer 50 and the optical layer 60 to the outside, and the "λ" is a wavelength of the light emitted from the light emitting diodes 40.

Once the maximum transmittance is calculated in this manner, it becomes possible to design an optical layer that has a reflectance corresponding to the maximum transmittance.

A part of the lights emitted from one of the light emitting diodes 40 mounted on the substrate 30 goes to the outside through the optical layer 60. The remaining part of the lights is reflected by the optical layer 60 and then advances toward the total reflection layer 50, at which time the lights are again reflected by the total reflection layer 50 toward the optical layer 60.

As the lights are repeatedly subjected to transmission and reflection, the lights projected to the outside through the optical layer 60 undergoes constructive interference, thus ensuring that the lights emitted from the light emitting diodes 40 are amplified prior to irradiation to the outside through the optical layer 60.

Furthermore, this helps to lengthen the travel path of the lights and thus makes it possible to efficiently mix the lights at the time when a white light is to be irradiated by mixing the lights emitted from the red, green and blue light emitting diodes.

Accordingly, it is preferred that the total reflection layer 50 has as great a reflectance as possible and as small a transmittance and absorbency as possible.

The optical layer 60 is formed by laminating oxide compounds or metallic materials. In case of laminating the oxide compounds, it is possible to independently or alternately laminate one or more layer of a low or medium refractive index oxide compound having a light refractive index "n" of smaller than 2.3 and a high refractive index oxide compound having a light refractive index "n" of equal to or greater than 2.3, as illustrated in FIG. 4A. As an alternative, it is also possible to independently or alternately laminate one or more layer of a medium refractive index oxide compound having a light refractive index "n" of greater than 1.5 but no greater than 2.3, a low refractive index oxide compound having a light refractive index "n" of 1.5 or less and a high refractive index oxide compound having a light refractive index "n" of greater than 2.3, as illustrated in FIG. 4B. In this case, the light absorbency is reduced and the luminance of the backlight unit is enhanced in proportion to the increase in the lamination thickness of the oxide compounds and the number of the layers laminated.

Laminating the layers of different refractive indexes improves the light reflecting property due to the inter-layer difference in the refractive indexes. The light absorbency is minimized and the light reflecting property is improved as the layers laminated grows in number.

$SiO_2$ is mainly used as the low refractive index oxide compound, $Nb_2O_5$ is mainly used as the medium refractive index oxide compound, and $TiO_2$, $Ta_2O_3$ or $Y_2O_3$ is used as the high refractive index oxide compound. Other oxide compounds may of course be used in due consideration of the reflective index.

Meanwhile, in case of forming the optical layer 60 with metallic materials, it is preferred that the metallic materials take the form of a thin film. Silver is suitable for the optical layer 60 and is preferably laminated to have a thickness of, e.g., 21 nm.

Figure 5:
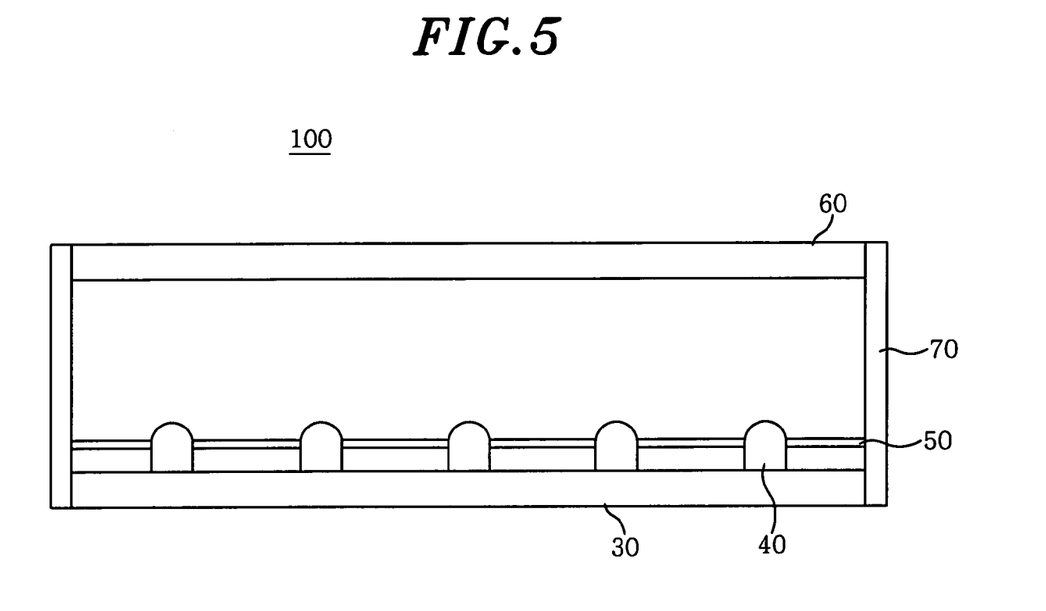
FIG. 5 is a front elevational view illustrating a backlight unit having side-reflecting portions in accordance with the present invention.

Referring to FIG. 5, there is shown a backlight unit provided with side-reflecting portions in accordance with one embodiment of the present invention. As shown in FIG. 5, the backlight unit 100 of the present invention further includes a pair of spaced-apart side-reflecting portions 70 each extending from the total reflection layer 50 up to the optical layer 60 at the opposite sides of the backlight unit 100. The side-reflecting portions 70 are adapted to prevent the lights emitted by the light emitting diodes 40 from any leakage in a transverse direction through between the total reflection layer 50 and the optical layer 60.

As with the total reflection layer 50, it is preferred that the side-reflecting portions 70 has as great a reflectance as possible and as small a transmittance and an absorbency as possible. The side-reflecting portions 70 acts to reflect the lights incident thereon from the light emitting diodes 40 toward the center of the backlight unit 100, thus increasing the quantity of the lights that penetrate the optical layer 60.

Figure 6A:
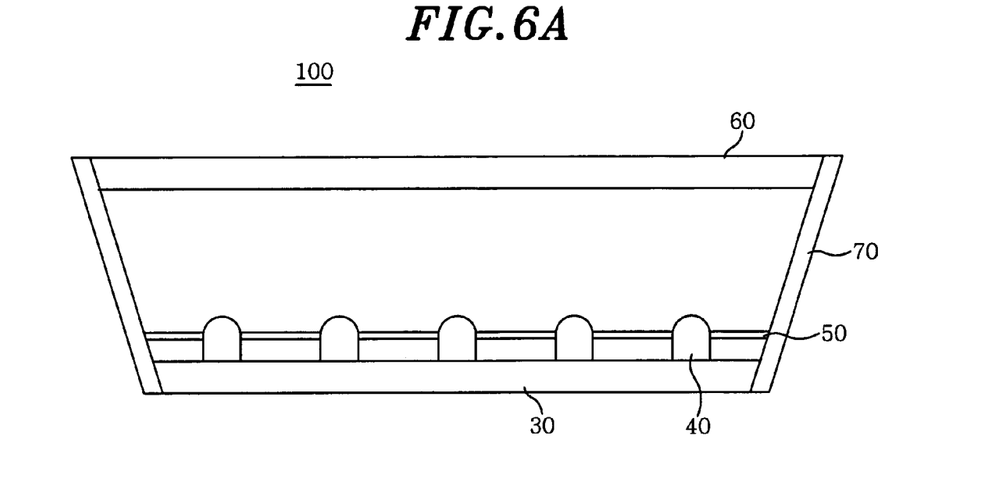
FIGS. 6A and 6B are front elevational views illustrating a variety of side-reflecting portions provided in the backlight units in accordance with the present invention.
Figure 6B:
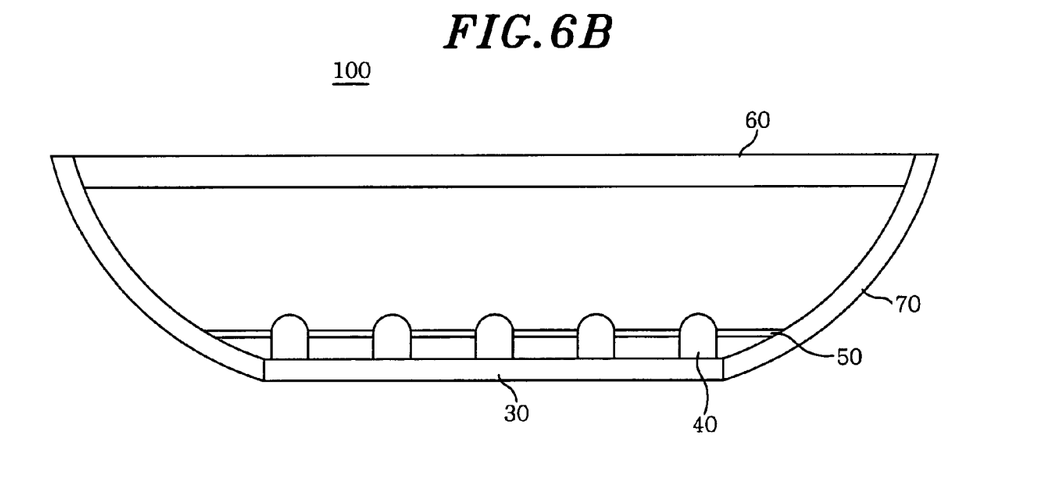
Figure 7A:
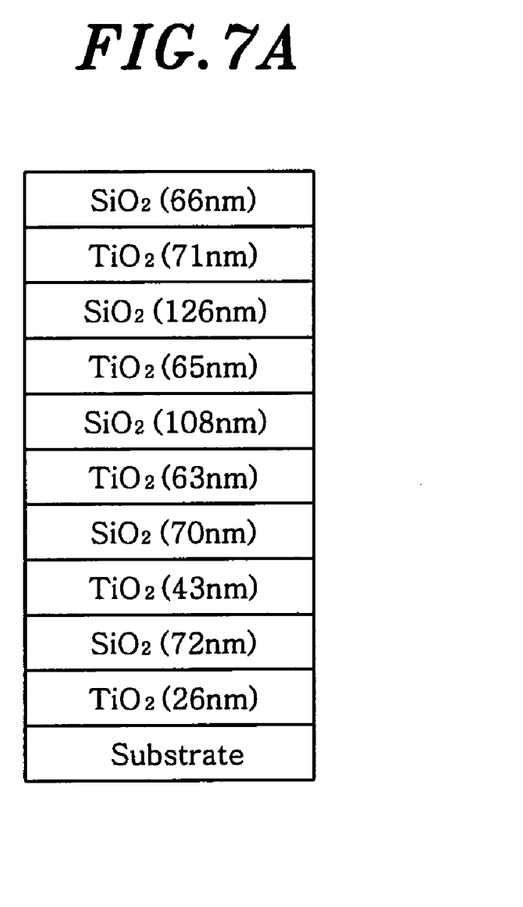
FIGS. 7A to 7E illustrate front elevational views showing laminated structures of an oxide compound in the optical layer in accordance with some test examples of the present invention.
Figure 7B:
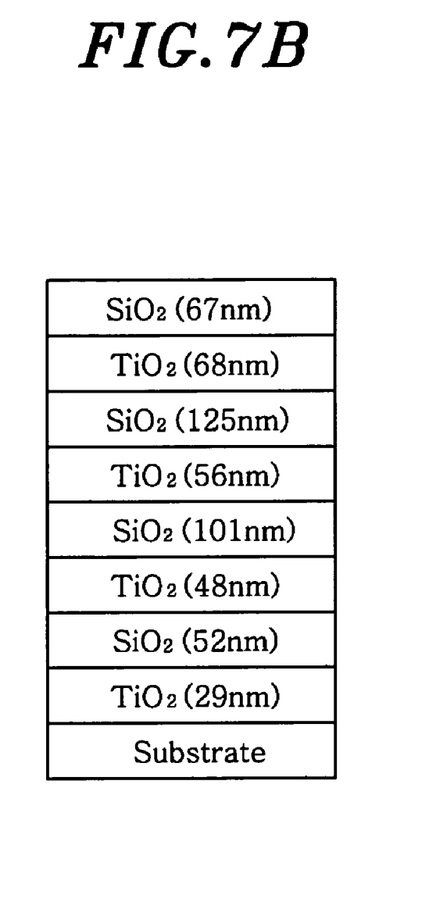
Figure 7C:
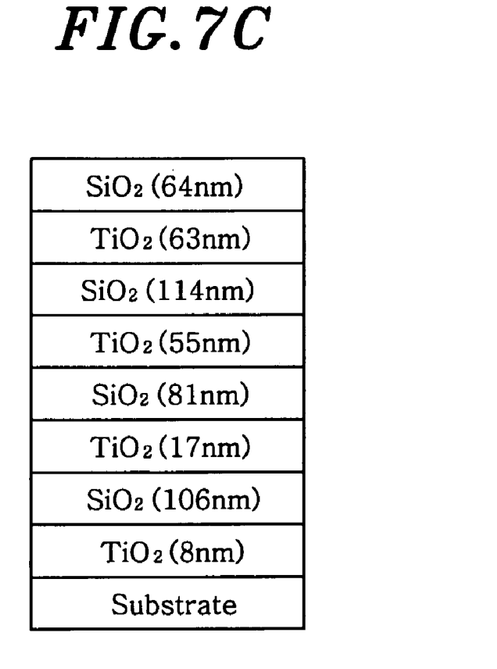
Figure 7D:
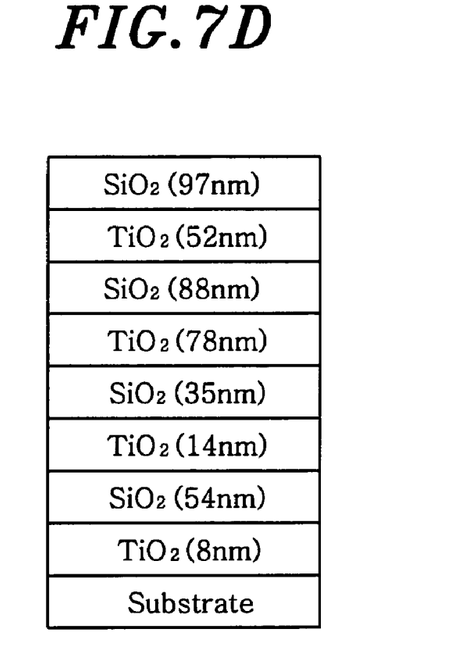
Figure 7E:
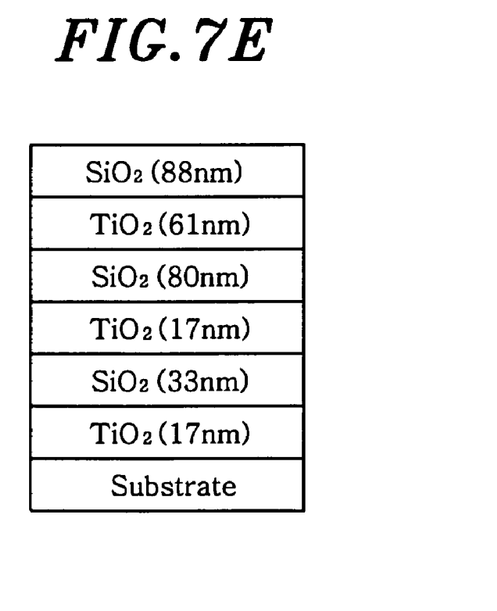

FIGS. 6A and 6B illustrate a variety type of side-reflecting portions provided in the backlight units in accordance with the present invention. As shown these drawings, it is preferred that the side-reflecting portions 70 of the backlight unit 100 are formed to extend upwardly outwardly from the total reflection layer 50 toward the optical layer 60. This is because the lights are irradiated to a target object through the optical layer 60 and therefore should preferably be reflected toward the optical layer 60. The side-reflecting portions 70 may be of a flat shape as shown in FIG. 6A, or a gently curved shape as depicted in FIG. 6B.

Description will now be given to actual examples of forming the optical layer 60 to manufacture the backlight unit 100 in accordance with the present invention.

FIGS. 7A to 7E are front elevational views showing laminated structures of an oxide compound in accordance with some test examples of the present invention.

Light emitting diodes of red, green and blue colors having an output power 1 W were prepared, the center wavelength of which is 627 nm in the red light emitting diode, 530 nm in the green light emitting diode, and 455 nm in the blue light emitting diode. Each of the light emitting diodes is of the type whose center wavelength varies within 5% depending on the driving current and the thermal characteristic. The driving current of the light emitting diodes is 200 mA.

The light emitting diodes thus prepared were grouped into a plurality of diode sets, each of which was mounted on a substrate at an equal spacing of 5-6 cm. Each of the diode sets consists of, e.g., one red light emitting diode, one green light emitting diode and one blue light emitting diode.

The combination of light emitting diodes in the respective diode sets may be modified arbitrarily and, likewise, the spacing between the diode sets may be changed depending on the number of light emitting diodes contained in each of the diode sets. For example, each of the diode sets may be comprised of two red light emitting diodes, two green light emitting diodes and one blue light emitting diode. Alternatively, each of the diode sets may be comprised of one red light emitting diode, two green light emitting diodes and one blue light emitting diode.

As illustrated in FIGS. 7A to 7E, five kinds of oxide compound-laminated structures (films) each containing an optical layer were produced. The optical layers of the respective structures have light transmittances of 40%, 50%, 60%, 70% and 80%, respectively, and are formed by laminating oxide compounds one atop above under the laminating conditions conforming to the boundary surface characteristics and the coating conditions of the oxide compound-laminated structures. The laminating conditions were derived through a computer simulation using an Essential McLeod program.

In this regard, FIGS. 7A, 7B, 7C, 7D and 7E show oxide compound-laminated structures having light transmittances of 40%, 50%, 60%, 70% and 80%, respectively.

In the oxide compound-laminated structures, the number of layers should be increased in order to make greater the light reflectance. Taking this into account, the oxide compounds were laminated ten times to obtain the laminated structure having a light transmittance of 40%. The lamination was conducted eight times to acquire the laminated structures having light transmittances of 50%, 60% and 70%. The lamination was performed six times to produce the laminated structure having a light transmittance of 80%.

Backlight units were fabricated using the five kinds of oxide compound-laminated structures thus obtained and the characteristics of the backlight units were evaluated. In parallel, a backlight unit having no optical layer and reflecting plate was fabricated for the comparison of a light resonance effect. The characteristics of the inventive backlight units and the comparative backlight unit were analyzed.

$SiO_2$ was used as the low refractive index oxide compound, while $TiO_2$ was used as the high refractive index oxide compound.

Figure 8:
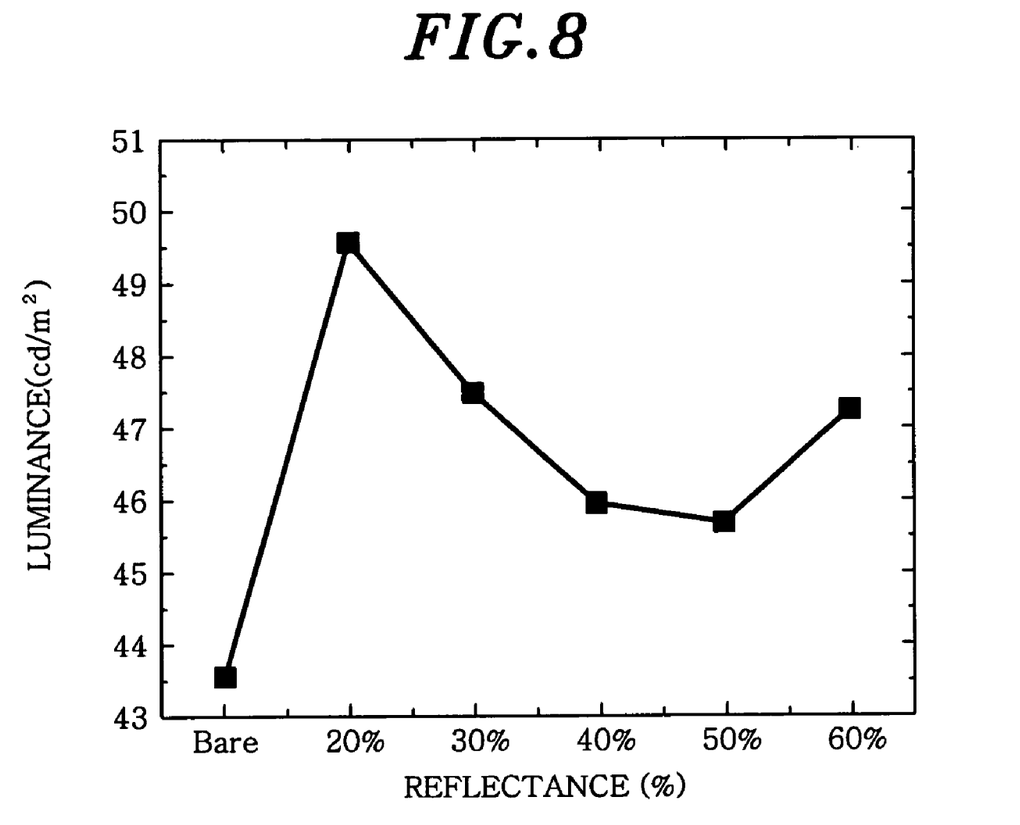
FIG. 8 graphically represents the correlation between a light reflectance and a luminance in the backlight units of the present invention and the comparative backlight unit.

FIG. 8 graphically represents the correlation between a light reflectance and a luminance in the backlight units having oxide compound-laminated optical layer of the present invention and the comparative backlight unit. In FIG. 8, the term "bare" represents a test result for comparative backlight unit that provides no optical resonance effect.

As is apparent in FIG. 8, the backlight unit comprised of an oxide compound-laminated optical layer having a light transmittance of 80% (i.e., 20% reflectance) exhibits a luminance 14% greater than that of the comparative backlight unit. In case of the backlight units comprised of oxide compound-laminated optical layers whose light transmittances are 40%, 50%, 60% and 70% (i.e., 60%, 50%, 40% and 30% reflectance), it can be seen that the luminance is increased to a greater extent than the luminance of the comparative backlight unit.

As described in the foregoing, the backlight unit of the present invention provides an advantageous effect in that an oxide compound-laminated optical layer can induce optical resonance of the lights and improve luminance of the backlight unit, while allowing the lights to be mixed with each other efficiently.

This reduces electricity consumption in the backlight unit that requires a white color light of high luminance, thus prolonging the life span of the backlight unit. Further, the optical resonance caused by the oxide compound-laminated optical layer helps to reduce the half amplitude of a color-based spectrum histogram in a light-emitting spectrum, thereby enhancing the color purity. In addition, a desired spectrum peak in the light-emitting spectrum can be obtained merely by adjusting the thickness of a total reflection layer and/or an optical layer.

While the invention has been shown and described with respect to the preferred embodiments, it will be understood by those skilled in the art that various changes and modification may be made without departing from the spirit and scope of the invention as defined in the following claims.

What is claimed is:

1. A backlight unit for use in a liquid crystal display having a liquid crystal panel, comprising:
   a substrate;
   a plurality of light sources arranged on the substrate in a spaced-apart relationship with one another for irradiating lights;
   a total reflection layer for reflecting the lights irradiated from the light sources in an upward direction; and
   an optical layer disposed above the light sources and having an oxide compound layer laminated thereon, the optical layer adapted to allow a part of the lights to pass through the optical layer but reflect the remaining part of the lights downwardly toward the substrate,
   whereby the backlight unit can induce the lights irradiated from the light sources to optically resonate.

2. The backlight unit of claim 1, wherein the optical layer is formed by successively forming a set of stacked layers, each individual layer containing an oxide compound having a refractive index different from a refractive index of another of said layers adjacent to such individual layer and such individual layer containing an oxide compound having a refractive index at least about the same as a refractive index of another of said layers remote from the individual layer.

3. The backlight unit of claim 2, wherein the oxide compound layers comprise a low or medium refractive index oxide compound layer having a refractive index of no greater than 2.3 and a high refractive index oxide compound layer having a refractive index of greater than 2.3.

4. The backlight unit of claim 2, wherein the oxide compound layers include a medium refractive index oxide compound layer having a refractive index of greater than 1.5 but no greater than 2.3, a low refractive index oxide compound layer having a refractive index of 1.5 or less and a high refractive index oxide compound layer having a refractive index of greater than 2.3.

5. The backlight unit of claim 1, wherein the optical layer comprises a metallic layer capable of transmitting and reflecting the lights irradiated on the optical layer.

6. The backlight unit of claim 1, wherein the sum of a refractive index of each of the total reflection layer and the optical layer multiplied by a geometrical thickness of each of the total reflection layer and the optical layer is equal to one half of a peak wavelength of the lights irradiated from the light sources multiplied by an integer, whereby the lights passed through the optical layer can make constructive interference with each other.

7. The backlight unit of claim 2, wherein the sum of a refractive index of each of the total reflection layer and the optical layer multiplied by a geometrical thickness of each of the total reflection layer and the optical layer is equal to one half of a peak wavelength of the lights irradiated from the light sources multiplied by an integer, whereby the lights passed through the optical layer can make constructive interference with each other.

8. The backlight unit of claim 3, wherein the sum of a refractive index of each of the total reflection layer and the optical layer multiplied by a geometrical thickness of each of the total reflection layer and the optical layer is equal to one half of a peak wavelength of the lights irradiated from the light sources multiplied by an integer, whereby the lights passed through the optical layer can make constructive interference with each other.

9. The backlight unit of claim 4, wherein the sum of a refractive index of each of the total reflection layer and the optical layer multiplied by a geometrical thickness of each of the total reflection layer and the optical layer is equal to one half of a peak wavelength of the lights irradiated from the light sources multiplied by an integer, whereby the lights passed through the optical layer can make constructive interference with each other.

10. The backlight unit of claim 1, further comprising spaced-apart side-reflecting portions each extending from the total reflection layer up to the optical layer at opposite sides of the backlight unit, each of the side-reflecting portions being adapted to prevent the lights irradiated by the light sources from any leakage in a transverse direction through between the total reflection layer and the optical layer.

11. The backlight unit of claim 2, further comprising spaced-apart side-reflecting portions each extending from the total reflection layer up to the optical layer at opposite sides of the backlight unit, each of the side-reflecting portions being adapted to prevent the lights irradiated by the light sources from any leakage in a transverse direction through between the total reflection layer and the optical layer.

12. The backlight unit of claim 10, wherein the side-reflecting portions are formed to extend upwardly outwardly from the total reflection layer toward the optical layer.

13. The backlight unit of claim 11, wherein the side-reflecting portions are formed to extend upwardly outwardly from the total reflection layer toward the optical layer.

14. The backlight unit of claim 1, wherein the total reflection layer is formed below a light-emitting portion of each of the plurality of light sources, and the optical layer is disposed above the total reflection layer.

15. The backlight unit of claim 14, further comprising spaced-apart side-reflecting portions each extending from the total reflection layer up to the optical layer at opposite sides of the backlight unit, each of the side-reflecting portions being adapted to prevent the lights irradiated by the light sources from any leakage in a transverse direction through between the total reflection layer and the optical layer.

* * * * *

UNITED STATES PATENT AND TRADEMARK OFFICE
CERTIFICATE OF CORRECTION

| | | |
|---|---|---|
| PATENT NO. | : 7,478,930 B2 | Page 1 of 1 |
| APPLICATION NO. | : 11/431581 | |
| DATED | : January 20, 2009 | |
| INVENTOR(S) | : Yong Won Choi | |

It is certified that error appears in the above-identified patent and that said Letters Patent is hereby corrected as shown below:

Column 1, line 15, "lightweight" should read --light weight--.
Column 1, line 41, "an" should read --a--.
Column 2, line 24, "thank" should read --thanks--.

Column 3, lines 56-63, delete the following:
"Hereinafter, preferred embodiments of the present invention will be described in detail with reference to the accompanying drawings.
FIG. 3 is a front elevational view depicting a part of a backlight unit in accordance with the present invention, and FIGS. 4A and 4B are front elevational views showing laminated structures of an oxide compound in the optical layer shown in FIG. 3."

Column 5, line 31, "In case" should read --In the case--.
Column 5, line 33, "layer" should read --layers--.
Column 5, line 39, "layer" should read --layers--.
Column 5, line 53, "grows" should read --grow--.
Column 6, line 10, "has" should read --have--.
Column 6, line 12, "acts" should read --act--.
Column 6, line 19, "shown these" should read --shown in these--.
Column 6, line 63, "atop above under" should read --atop, above and under--.
Column 7, line 25, "layer" should read --layers--.
Column 7, line 27, "for comparative" should read --for a comparative--.

Signed and Sealed this

Thirteenth Day of July, 2010

David J. Kappos
*Director of the United States Patent and Trademark Office*